Figure 1:
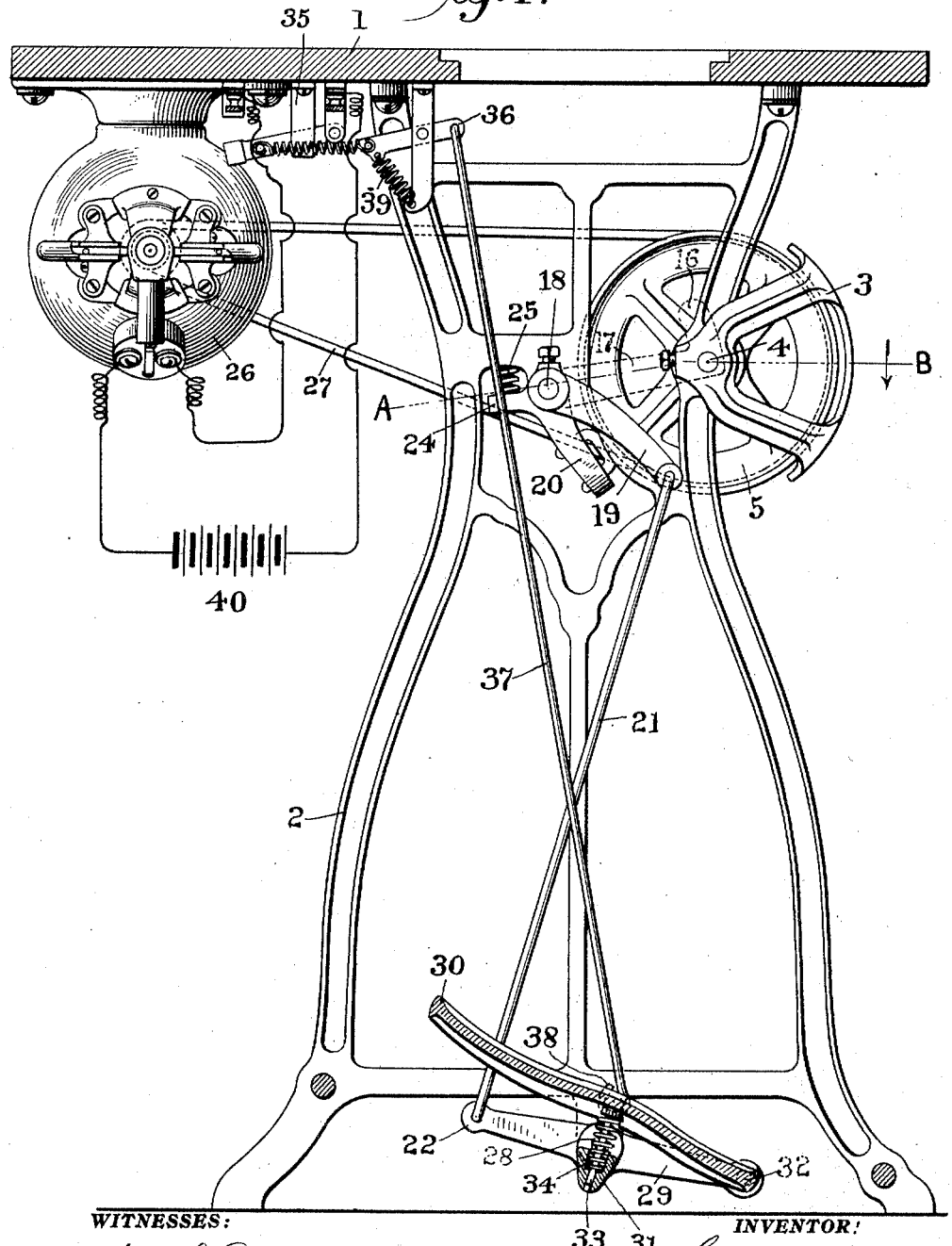

No. 759,166. PATENTED MAY 3, 1904.
G. M. EAMES.
POWER TRANSMITTER.
APPLICATION FILED SEPT. 25, 1903.
NO MODEL. 2 SHEETS—SHEET 1.

WITNESSES: INVENTOR!
Ada C. Briggs George M. Eames
BY
ATTORNEY

No. 759,166. PATENTED MAY 3, 1904.
G. M. EAMES.
POWER TRANSMITTER.
APPLICATION FILED SEPT. 25, 1903.
NO MODEL. 2 SHEETS—SHEET 2.
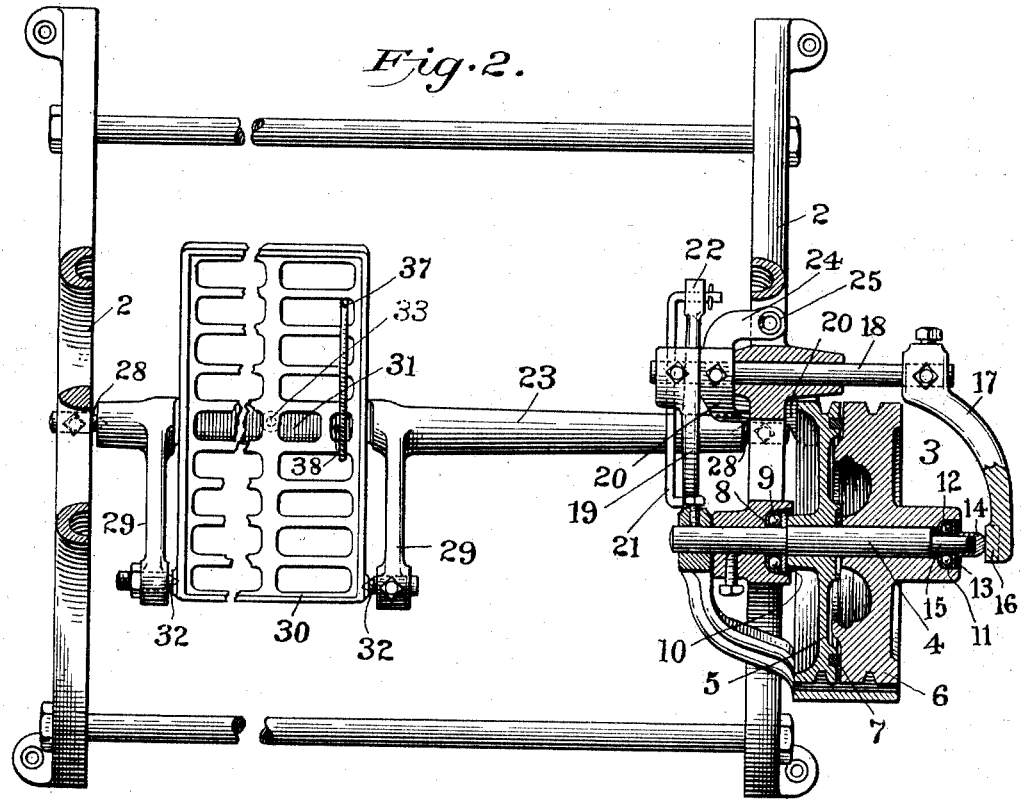
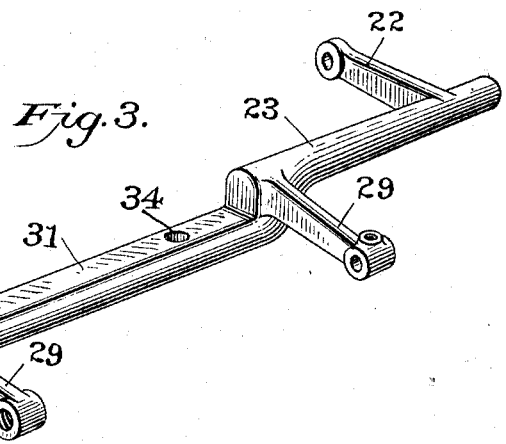
WITNESSES:
Ada C. Briggs
INVENTOR:
George M. Eames
BY
ATTORNEY No. 759,166. Patented May 3, 1904.

UNITED STATES PATENT OFFICE.

GEORGE M. EAMES, OF BRIDGEPORT, CONNECTICUT, ASSIGNOR TO WHEELER & WILSON MANUFACTURING COMPANY, OF BRIDGEPORT, CONNECTICUT, A CORPORATION OF CONNECTICUT.

POWER-TRANSMITTER.

SPECIFICATION forming part of Letters Patent No. 759,166, dated May 3, 1904.

Application filed September 25, 1903. Serial No. 174,648. (No model.)

*To all whom it may concern:*

Be it known that I, GEORGE M. EAMES, a citizen of the United States, residing at Bridgeport, in the county of Fairfield and State of Connecticut, have invented a certain new and useful Improvement in Power-Transmitters, of which the following is a full, clear, and exact description.

The object of this invention is to provide means whereby the operator of a power-driven machine may temporarily suspend the operation of the machine without affecting the operation of the source of power and may also control the speed of the machine and may also suspend the operation of the source of power at will.

To illustrate one application of the invention, reference is made to those sewing-machines which are supplied with individual electric motors. It is obviously desirable to economize the electric current when it is furnished by meter. If the current be cut off and the motor stopped on every occasion when it is desired to stop the sewing-machine even for a very short time, it is obvious that there is a wear and tear on the apparatus that is hardly offset by the economy of current. On the other hand, it is equally obvious that if the operation of the sewing-machine is to be suspended for any considerable period without stopping the motor there is a considerable waste of current. Obviously, it is desirable to provide means whereby the sewing-machine may be stopped temporarily without affecting the motor and the speed be readily controlled and the motor stopped whenever the operation of the sewing-machine is suspended designedly or through inattention for any considerable period.

The present invention embodies the combination of a motor, a transmitting device, and a controlling mechanism whereby the motor may be started and the operation of the transmitting device controlled independently of the motor so as to suspend the operation of the transmitting device while the motor is still running and also whereby both the transmitting device and the motor may be stopped.

Without thereby limiting the invention it is herein shown as applied to a sewing-machine stand for driving a sewing-machine, and it comprises an electric motor operatively connected with a transmitting device from which power is transmitted to the sewing-machine, and the motor is independently connected with a treadle by which it may be started into operation, and the treadle is independently connected with the transmitting device, and such treadle has a compound movement whereby the transmitting device may be stopped and started at pleasure independently of the motor and the motor stopped coincidently with the transmitting device at the will of the operator.

In the accompanying drawings, illustrating the invention, in the several figures of which like parts are similarly designated, Figure 1 is an elevation of a power-stand for a sewing-machine provided with this improvement, the table and the treadle being shown in cross-section. Fig. 2 is a horizontal section taken substantially in the plane of the line A B, Fig. 1, and looking down. Fig. 3 is a perspective view of the treadle rock-shaft. Fig. 4 is a perspective view of a shipper-lever.

Describing the invention as shown in the drawings, 1 is the top of the table or stand, supported by legs 2.

3 is a power-transmitter, which may be of any suitable or approved construction, but in the preferred construction comprising a spindle 4, fast in one of the legs 2, upon which are journaled loose pulleys 5 and 6.

7 is a friction-ring seated within an annular groove in the face of the pulley 5 and adapted to coöperate with the adjacent face of the pulley 6 when said pulleys are pressed together, as will be presently explained.

8 is a socket formed in the leg 2 around the spindle 4, and 9 is a suitable ball-bearing within said race to receive the end thrust of the pulley 5 when the pulleys are pressed together, a suitable hardened washer 10 being interposed between the hub of said pulley 5 and the balls.

11 is a socket formed in the outer side of the hub of the pulley 6 and having therein a suitable ball-bearing 12, against which is placed a hardened washer 13, upon which bears the inner end of a tubular cap 14, centered around the reduced end 15 of the spindle 4 and having a closed rounded end adapted to be engaged by the wedge-shaped end 16 of a shipper-lever 17, (see Fig. 4,) tight on the outer end of a rock-shaft 18, (see Fig. 2,) journaled in the leg 2. Secured on the inner end of the rock-shaft 18 are levers 19 and 20, the lever 19 being connected by a pitman-rod 21 with an arm 22, extending from the treadle rock-shaft 23, while the lever 20 depends downwardly and outwardly through the leg 2 and engages the periphery of the pulley 5 to act as a brake. Said lever 20 also has a finger 24, which is engaged by a spring 25, adapted to keep said brake-lever pressed against the pulley 5.

The pulley 5 is connected with any suitable electric motor 26 by a belt 27, and the pulley 6 is belted up to the sewing or other machine to be driven (not shown) in any usual manner.

The treadle rock-shaft 23 is pivoted between the legs 2 on pintles 28, secured to said legs, and has a pair of laterally-projecting arms 29, between which is pivoted at its heel end a treadle 30, said rock-shaft being offset, as shown at 31, to accommodate the independent action of the treadle on its pivots 32.

33 is a spring-pressed plunger mounted in a recess 34 in the offset portion 31 of the treadle rock-shaft 23, by means of which the treadle 30 is raised and upheld when the operator's foot is removed. This treadle mechanism is herein referred to as the "controller" and may be replaced by others of like capability.

35 is any suitable electrical switch, to the operating-lever 36 of which is attached the upper end of a connecting-rod 37, the lower end of which latter is attached at 38 to the treadle 30 at a point approximately in line with the pivotal axis of the rock-shaft 23.

39 is a spring attached to the operating-lever 36 of the switch and of sufficient strength to effect the operation of breaking the electric circuit upon the return of the treadle 30 to normally elevated position as the operator's foot is removed therefrom.

40 is any suitably battery, the electrical connections from which are wired to the motor and switch in the usual manner, substantially as indicated in the drawings.

It will be observed that the treadle as thus constructed rocks upon two different fulcrums, shifting alternately from one to the other, the initial movement occurring with the pintles 32 as a center and the succeeding movement taking place on the pivotal axis of the treadle rock-shaft 23. Depressions of the treadle 30 will cause the same to swing on the center 32 until such movement is arrested by said treadle abutting against the offset portion 31 of the treadle rock-shaft 23, whereupon both treadle and rock-shaft will be, in effect, locked together, and further depression of the treadle will then cause both treadle and rock-shaft to move in unison on the pivotal axis of the latter, which will of course through the pitman connection 21 control the action of the transmitter.

The reason for attaching the lower end of the switch-connecting rod 37 at a point approximately in line with the pivotal axis of the treadle rock-shaft 23 is to minimize the vertical movement of said rod whenever the treadle is being tilted on the center of said rock-shaft, at which time the machine is in operation, so as not to disturb the position of the switch-operating lever 36.

The operation is as follows: As the operator assumes her position to use the machine the instant her foot is placed upon the treadle the latter will be depressed sufficiently to shift the operating-lever 36 of the electric switch and close the circuit, thereby starting the motor, such movement, as previously pointed out, taking place on the pintles 32 as a center. Further downward movement of the treadle will now bring into action the transmitter, which is not in the slightest affected by the initial movement of the treadle, for the reason that the spring 25 of the transmitter is of greater power than the slight spring-pressed plunger 33, which upholds the treadle. When the treadle is released, it will resume its raised position, and the spring 39 will cause the operating-lever 36 of the switch to shift and break the circuit, thereby shutting off the electric current and preventing unnecessary waste. Simultaneous with starting of the motor the pulley 5 is caused to revolve, from which motion is transmitted to the pulley 6 by pressing the latter against the pulley 5, and thence to the driven machine through the usual belt connection. Forcing these pulleys together is effected by a downward draft on the pitman-rod 21, which causes the wedge-shaped end 16 of the lever 17, through the rock-shaft 18 and lever 19, to shift the pulley 6 laterally on the spindle 4, around which it revolves, and press more or less tightly against the friction-ring 7, seated in the face of the pulley 5. Said pulleys being thus coupled together by frictional contact only, the speed of the pulley 6 with respect to the pulley 5 will be in proportion to the pressure holding them together, which of course may be varied by the operator to cause more or less slipping between the pulleys, and thereby vary the speed of the machine to conform to the exigencies of the particular kind of work being done. The spring 25 aside from actuating the brake-lever 20 also serves to return these parts to normal position.

What I claim is—

1. A power-transmitter, comprising a transmitter proper, an electric motor, connections between the two, a treadle, and connections thereof with the transmitter proper, in combination with an electric switch, an electric circuit upon which it is placed, and means for making and breaking the circuit by operation of the treadle.

2. In a power-stand, a transmitter, an electric motor, connections between them, a treadle having suitable connection with said transmitter, and means, including an electric switch, for making the electric circuit through said motor simultaneously with the depression of the treadle and capable of effecting an independent control of the motor and transmitter, in combination with means for automatically breaking said circuit when said treadle is released.

3. In a power-stand, a transmitter, an electric motor, connections between them, a treadle, and connections between the treadle, transmitter and motor, for effecting the control of the transmitter and motor independently, in combination with means for stopping the motor when the treadle is released.

4. In a power-stand, a transmitter, an electric motor, connections between them, a treadle rock-shaft, connections between said shaft and transmitter, a treadle pivoted eccentrically upon said rock-shaft, and connections, including an electric switch, between said treadle and motor, whereby the said motor is stopped and started when said treadle is respectively depressed and released.

5. In a power-stand, a transmitter, an electric motor, connections between them, a treadle rock-shaft having laterally-projecting arms, a treadle pivoted at its heel end between said arms and adapted to receive an initial movement without rocking the rock-shaft, and also to receive a further movement for rocking the rock-shaft, and connections between said treadle and the motor adapted to be actuated by the initial movement of the treadle.

6. In a power-stand, a transmitter, an electric motor, connections between them, an electric switch and an electric circuit for supplying power to the motor, a treadle rock-shaft, connections between it and the transmitter, a treadle eccentrically pivoted to the rock-shaft, a depressible spring interposed between the treadle and the rock-shaft whereby said treadle may have an initial movement without effecting the movement of the rock-shaft, and a subsequent movement in conjunction with the rock-shaft, a connection between the treadle and the electric switch operated by the initial movement of the treadle, and means for actuating the switch to stop the motor simultaneously with the release of the treadle.

7. In a power-stand, a transmitter, an electric motor, connections between them, an electric switch and an electric circuit for supplying power to the motor, a treadle rock-shaft, connections between it and the transmitter, a treadle eccentrically pivoted to the rock-shaft, a depressible spring interposed between the treadle and the rock-shaft whereby said treadle may have an initial movement without effecting the movement of the rock-shaft, and a subsequent movement in conjunction with the rock-shaft, a connection between the treadle and the electric switch operated by the initial movement of the treadle, and a spring for actuating the switch to stop the motor simultaneously with the release of the treadle.

8. A power-transmitter, comprising a motor, a pair of loose pulleys, one of which is adapted to be connected with the motor, and the other with the machine to be driven, means to connect said pulleys to run in unison, and to admit of one running independently of the other, a controller, a connection between it and the motor for stopping and starting said motor, and independent connections between said controller and the pulleys, whereby one of said pulleys may be stopped while the other is running.

9. A power-transmitter, comprising a motor, a pair of loose pulleys, one of which is adapted to be connected with the motor, and the other with the machine to be driven, means to connect said pulleys to run in unison, and to admit of one running independently of the other, a controller, a connection between it and the motor for stopping and starting said motor, and independent connections between said controller and the pulleys, whereby one of said pulleys may be stopped while the other is running, and whereby the motor will be stopped when the controller is wholly released.

In testimony whereof I have hereunto set my hand this 23d day of September, A. D. 1903.

GEORGE M. EAMES.

Witnesses:
NEWTON H. HOYT,
C. N. WORTHEN.